(12) United States Patent
Hammerschmidt et al.

(10) Patent No.: US 7,860,174 B2
(45) Date of Patent: Dec. 28, 2010

(54) METHOD AND APPARATUS FOR FREQUENCY DOMAIN COMPENSATION OF DC OFFSET IN AN ORTHOGONAL FREQUENCY DIVISION MULTIPLEXING SYSTEM

(75) Inventors: Joachim S. Hammerschmidt, Mountain View, CA (US); Xiaowen Wang, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 1529 days.

(21) Appl. No.: 11/141,271

(22) Filed: May 31, 2005

(65) Prior Publication Data

US 2006/0269003 A1 Nov. 30, 2006

(51) Int. Cl.
*H04K 1/10* (2006.01)
(52) U.S. Cl. ............ 375/260; 375/316; 375/338; 375/339; 375/319; 375/346; 455/296; 455/63.1; 455/278.1; 455/67.13
(58) Field of Classification Search ............ 375/260, 375/278, 285, 340, 346, 349, 316, 338, 339, 375/319; 455/296, 63.1, 278.1, 67.13
See application file for complete search history.

(56) References Cited

U.S. PATENT DOCUMENTS 7,272,109 B2 * 9/2007 Webster et al. ............ 370/208
7,313,125 B2 * 12/2007 Hori et al. .................. 370/343
2003/0043733 A1 * 3/2003 Maeda et al. ............... 370/210
2003/0152021 A1 * 8/2003 Wang et al. ................ 370/208
2004/0105506 A1 * 6/2004 Baek et al. ................. 375/260
2004/0228418 A1 * 11/2004 Brotje et al. ............... 375/260

FOREIGN PATENT DOCUMENTS

WO    WO03/081865    * 10/2003

OTHER PUBLICATIONS

Stefano Marsili, "DC offset estimation in OFDM based WLAN appliation"; Globecom 2004,IEEE communications Society, pp. 3531-3535.*

* cited by examiner

*Primary Examiner*—David C Payne
*Assistant Examiner*—Rahel Guarino
(74) *Attorney, Agent, or Firm*—Ryan, Mason & Lewis, LLP

(57) ABSTRACT

Methods and systems are provided for estimating the DC offset distortion in a receiver. A fast Fourier transform is applied to at least a portion of a preamble portion of the received signal; an impact of the DC offset distortion on one or more empty subcarriers is determined; individual DC estimates are derived based on each of the determinations; and each of the individual DC estimates are combined to obtain an overall DC estimate.

22 Claims, 5 Drawing Sheets

FIG. 3

SHORT PREAMBLE 310 | LONG PREAMBLE 320

$t_0$ | $t_1$ | $t_2$ | $t_3$ | $t_4$ | $t_5$ | $t_6$ | $t_7$ | $t_8$ | $t_9$ | GI | T1 | T2

10 × 16 SAMPLES @ 20 MHz = 10 × 0.8µs = 8µs

32 + 2 × 64 SAMPLES @ 20 MHz = 8µs

PREAMBLES → HPF (410) → F-OFFSET ESTIMATION (415) $\exp(-j..)$

PREAMBLES AND DATA → BUFFER (420) → ⊗ (425) → PREAMBLES → BUFFER (435) → ⊕ (440) → BUFFER (450) → "CLEAN" DATA

F-OFFSET AND DC CORRUPTED PREAMBLES AND DATA

DC CORRUPTED PREAMBLES AND DATA

DC ESTIMATE (430) → $DC_{est}\exp(-j..)$

LONG PREAMBLE → CHANNEL ESTIMATE (445)

FFT OF 4 SHORT PREAMBLES WITH DC OFFSET

128 POINT FFT ⇨ $R_L[q]$, $q \in \{..., -3, -1, +1, +3, ...\}$

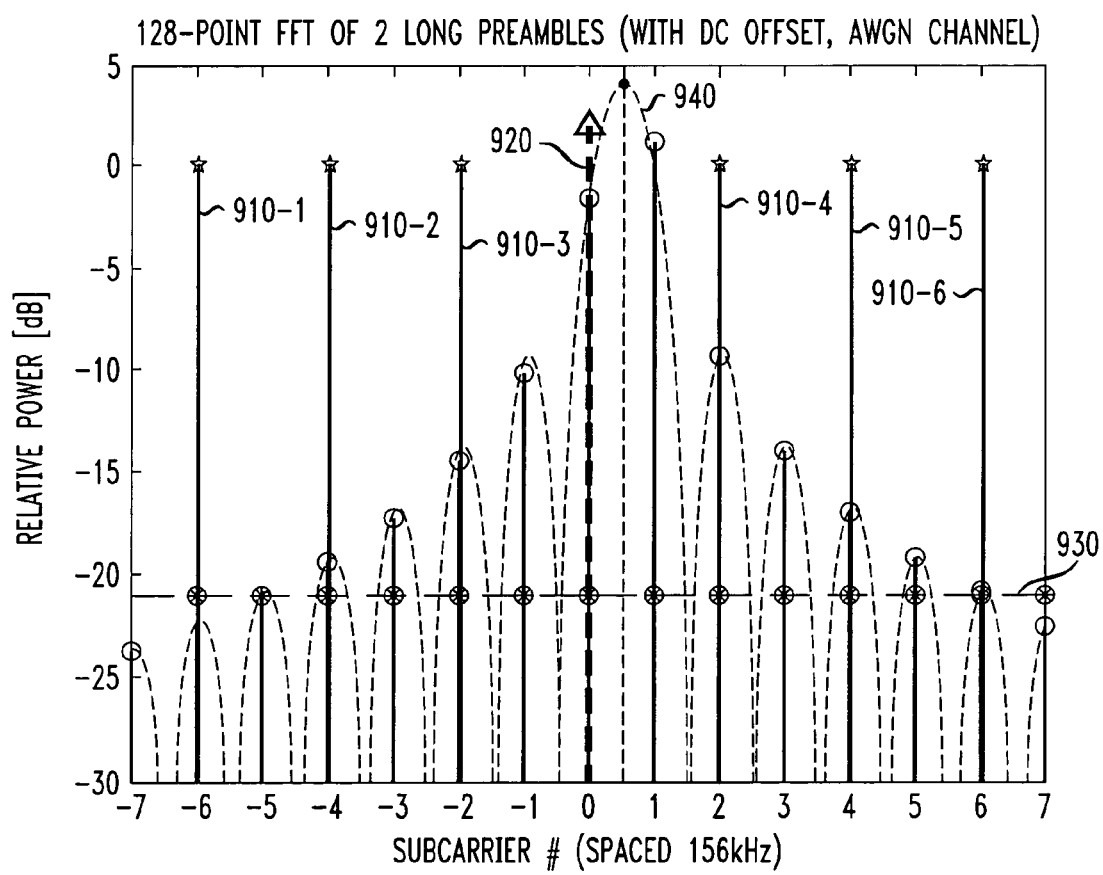

US 7,860,174 B2

METHOD AND APPARATUS FOR FREQUENCY DOMAIN COMPENSATION OF DC OFFSET IN AN ORTHOGONAL FREQUENCY DIVISION MULTIPLEXING SYSTEM

FIELD OF THE INVENTION

The present invention relates generally to Orthogonal Frequency Division Multiplexing (OFDM) systems, and more particularly, to methods and apparatus for estimating and compensating for the DC offset in an OFDM receiver.

BACKGROUND OF THE INVENTION

Most existing Wireless Local Area Network (WLAN) systems based upon OFDM modulation techniques comply with the IEEE 802.11a/g standard (see, IEEE Std 802.11a-1999, "Part 11: Wireless LAN Medium Access Control (MAC) and Physical Layer (PHY) Specification: High-speed Physical Layer in the 5 GHz Band"). In order to support evolving applications, such as multiple high-definition television channels, WLAN systems must be able to support ever increasing data rates. Accordingly, next generation WLAN systems should provide increased robustness and capacity.

The OFDM modulation technique is especially sensitive to a DC offset in the received signal. Receiver DC offset is due to, among other things, self-mixing of the local oscillator in the radio circuit, leading to a constant term that is superimposed on the useful signal components going into the Analog-to-Digital (A/D) conversion and subsequently into the Digital Signal Processor (DSP). In particular, if there is a DC offset as well as residual frequency offsets in an OFDM system, the unwanted signal components can overlap at least partially on the lower OFDM subcarriers, leading to significant performance degradations.

A number of techniques have been proposed or suggested to mitigate or reduce the effects of DC offset (e.g., DC offset calibration or AC coupling). Nonetheless, it remains difficult to meet the requirements of the higher data rates of the OFDM modulation specification (such as 64 QAM at 54 Mbps or higher). One proposed technique attempts to avoid the DC offset entirely in the analog domain. It has been found, however, that it is impossible to always avoid DC offset, especially when there are temperature fluctuations. Existing analog domain DC compensation schemes are insufficient to provide the degree of "cleanliness" needed for high-speed modes in OFDM or MIMO-type of extensions. In the context of 802.11a/g, it has been suggested to avoid frequency offset in the analog domain. In such an implementation, the DC term falls on the zero-th subcarrier, which is not utilized in the standard specification. Nonetheless, it is often difficult to control the analog parameters to a degree required by high-speed modes in OFDM or MIMO-type of extensions.

U.S. patent application Ser. No. 10/918,223, entitled "Method and Apparatus for Estimating DC Offset in an Orthogonal Frequency Division Multiplexing System," discloses techniques for estimating and compensating for DC offset in an OFDM receiver. Generally, the DC offset estimation is accomplished by subtracting a sum of time domain samples of an OFDM symbol for two consecutive OFDM symbols or subtracting a known transmitted OFDM symbol and a frequency domain representation of a received version of the known OFDM symbol (at least one of which is adjusted to compensate for channel distortion).

A need still exists for improved methods and systems to estimate the DC offset in an OFDM receiver. A further need exists for improved methods and systems that compensate for such DC offset.

SUMMARY OF THE INVENTION

Generally, methods and systems are provided for estimating the DC offset distortion in a receiver. According to one aspect of the invention, a fast Fourier transform is applied to at least a portion of a preamble portion of the received signal; an impact of the DC offset distortion on one or more empty subcarriers is determined; individual DC estimates are derived based on each of the determinations; and each of the individual DC estimates are combined to obtain an overall DC estimate.

In one implementation, the at least a portion of a preamble portion is a number of short preamble symbols from a Short Preamble, and the determining step determines a content of empty subcarriers in the number of short preamble symbols. In another implementation, the at least a portion of a preamble portion is at least two long preamble symbols from a Long Preamble, and the determining step determines a content of empty subcarriers in the at least two long preamble symbols. In yet another implementation, the fast Fourier transform is applied to each of at least two long preamble symbols from a Long Preamble, a result of each of the fast Fourier transforms are subtracted and a content of empty subcarriers following the subtraction is determined. In another implementation, at least two long preamble symbols are subtracted in a time domain, the fast Fourier transform is applied to the subtracted time domain sequence, and a content of empty subcarriers following the fast Fourier transform is determined.

A more complete understanding of the present invention, as well as further features and advantages of the present invention, will be obtained by reference to the following detailed description and drawings.

BRIEF DESCRIPTION OF THE DRAWINGS

FIG. 3 illustrates an OFDM preamble structure;

FIG. 4 is a schematic block diagram illustrating the data flow for processing of the preamble;

FIG. 9 illustrates a 128-point FFT across two Long Preambles with a DC offset term at 90 kHz; and FIG. 10 illustrates the processing performed in accordance with the LD-64 DC offset compensation scheme applied to the long preamble.

DETAILED DESCRIPTION

Figure 1:
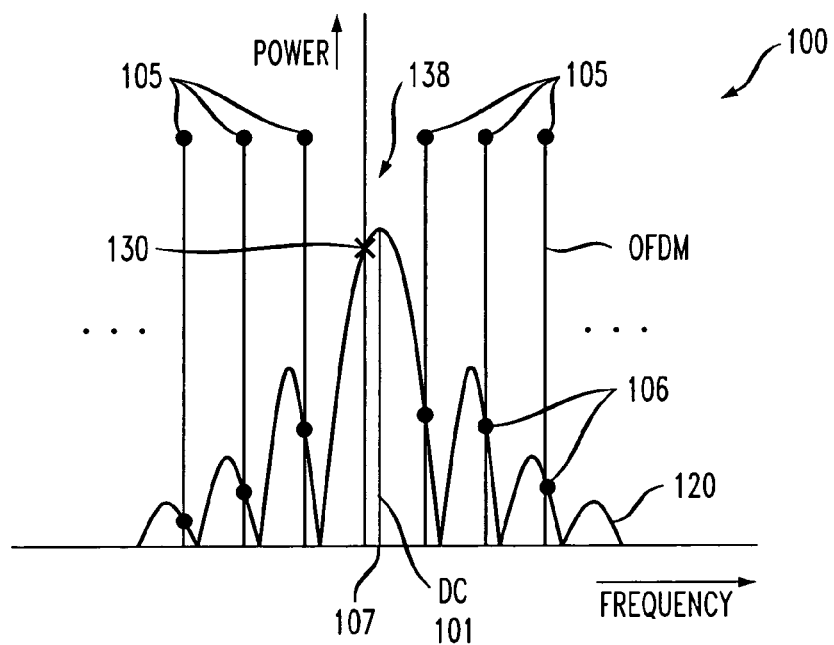
FIG. 1 illustrates a spectrum of an OFDM receiver and a subcarrier distortion due to a DC offset.

The signal received by an OFDM receiver consists of the original transmitted signal plus the distortion caused by DC offset and other impairments. The present invention recognizes that the structure of the OFDM preamble (training information at packet header) can be exploited to estimate and compensate for the DC offset. The impact of the DC term on the unused subcarriers in the Short Preamble is evaluated, and then various DC estimates are obtained and combined optimally in terms of signal-to-noise ratio, to form and then subtract one overall DC estimate. The overall estimate can optionally be based on the impact of the DC effect on artificial intermediate subcarriers that are generated by taking a long preamble across the two Long Preambles.

In an 802.11a/g OFDM format, frequency offset and DC offset are closely interrelated. If there is no frequency offset between the local oscillators of the transmitter and receiver, application of the FFT in the DSP will concentrate any transmitter or receiver generated DC term in the zero-th OFDM subcarrier. Since this zero-th subcarrier is not used to transmit information, any DC energies can be isolated from the other information-bearing subcarriers in the reception process.

In practice, however, the analog I/Q signal provided by the analog circuit to the A/D converter and subsequently to the digital signal processing exhibits a frequency offset. Thus, any receiver generated DC component will become a discrete-time complex sinusoid oscillating at the inverse of the frequency offset after digital frequency offset correction. Since this sinusoid is typically off the OFDM grid (any resulting offset in the possible range −230 kHz to 230 kHz except 0 Hz offset will be), it will interfere with the other subcarriers when the FFT is taken (especially for the lower subcarriers close to DC).

Thus, in an OFDM system, it is desirable to avoid either DC offset or frequency offset sufficiently in the analog domain, in order to preserve the OFDM signal integrity as long as the other offset is within a predefined tolerance (e.g., the DC offset should not saturate blocks, even if the analog frequency offset is zero). The present invention provides digital DC compensation schemes. The DC offset is estimated in the frequency domain (FFT domain) based on only the preamble. A number of disclosed techniques in accordance with the present invention derive DC estimates in the frequency domain after taking a fast Fourier transform (FFT) of certain sections or forms of the Short or Long Preambles.

DC Offset in OFDM Systems

The effects of DC offset at the receiver are principally due to the orthogonality requirement of OFDM. Essentially, the DC component "spills over" into the other subcarriers during the fast fourier transform (FFT) process when it is not exactly orthogonal to the OFDM spectrum due to frequency offset between transmitter and receiver. The IEEE 802.11a standard allows a frequency offset of only 50 ppm in total (40 ppm for the IEEE 802.11g standard).

FIG. 1 illustrates the receiver OFDM spectrum and the subcarrier distortion due to the DC offset. In addition to the DC term (subcarrier 0), the IEEE 802.11a/g standard defines the use of a total of 52 subcarriers. Since the transmitter and receiver are not synchronized in frequency, a small frequency offset exists between the transmitter and receiver spectra. Therefore, the receiver DC component 101 is not added exactly in the middle of the OFDM symbol, but is offset to position 107 in relation to the other subcarriers, as shown in FIG. 1 (not all subcarriers are shown).

In FIG. 1, the spikes 105 indicate the subcarriers of a received OFDM symbol. (Normally, the amplitude per subcarrier varies due to channel and modulation, but this is not shown for the sake of clarity.) When an OFDM signal is received with an arbitrary frequency offset 138, the receiver DC offset is added to the OFDM signal 120 at a non-orthogonal frequency. The result is distortion to all subcarriers 105 of an OFDM symbol. After the time-to-frequency transformation, the windowed DC component causes a sinc-like function 120 in the frequency domain. Due to the small frequency offset 138, the nulls of the sinc-function are not exactly aligned with the subcarrier spacing (i.e., not orthogonal) and the DC offset causes distortion to the other subcarriers 106. This reduces the data rates at which the system can satisfactorily operate.

Figure 2:
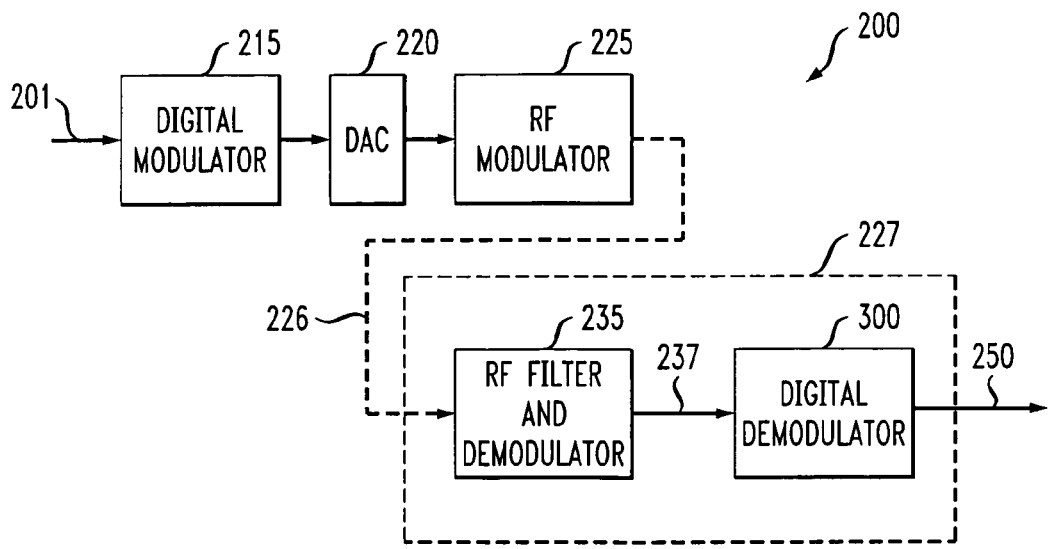
FIG. 2 is a schematic block diagram of an exemplary conventional IEEE 802.11a/g system.

FIG. 2 is a schematic block diagram of an exemplary IEEE 802.11a/g system 200. As shown in FIG. 2, a source baseband signal 201 is modulated in the digital domain by modulator 215 and, after digital-to-analog conversion (block 220), the signal is upconverted to RF frequencies in the analog domain by RF modulator 225 and transmitted. At an OFDM receiver 227, the signal 226 is filtered to extract the desired frequency band and downconverted to a baseband signal by an analog RF filter and demodulator 235. The baseband signal 237 is then converted to digital and demodulated (block 240) in the digital domain to recreate the original data stream 250.

OFDM Preamble Processing

FIG. 3 illustrates an OFDM preamble structure 300. As shown in FIG. 3, the OFDM preamble structure 300 comprises a short preamble 310 having ten short training symbols and a long preamble 320 having a guard interval and two long training symbols. In a typical receiver setup, the ten symbols of the Short Preamble 310 are used to detect a packet, perform automatic gain control (AGC), and perform a coarse frequency offset and coarse timing offset estimation. The two symbols of the Long Preamble 320 on the other hand are used to do a fine-frequency offset estimation and fine timing offset estimation and to obtain the channel estimate.

FIG. 4 is a schematic block diagram 400 illustrating the data flow for an exemplary processing of the preamble 300. As shown in FIG. 4, following automatic gain control processing, the frequency offset is estimated at stage 415 based on the Short and Long Preambles. If necessary for frequency offset accuracy, the preamble can be high-pass filtered 410. It is noted that the corner frequency of this high pass filter 410 can be relatively high if a low latency is desired (e.g., several MHz) (some of the lower subcarriers can be suppressed in the frequency offset estimation process which relies merely on the periodicity of the signal).

In addition, while the preamble is processed at stage 415, the incoming preamble and data samples are buffered 420 and then, once the frequency offset estimation is available, frequency corrected by applying the offset estimate to a multiplier 425. The frequency corrected signal is passed forward to the DC offset cancellation, as discussed further below. The DC offset cancellation schemes treated here exploit preamble samples alone; hence, the focus is on an acquisition of the DC offset at the beginning of the packet rather than a DC offset tracking. The Data part of the incoming signal is again buffered in a buffer 435 until the DC estimate is extracted from the preamble at stage 430. Then, the estimated DC is subtracted by a subtractor 440, taking into account the fact that at this stage the DC component is a discrete-time complex sinusoid at the inverse of frequency offset. Finally, the preamble is processed at stage 445 for channel estimation while the data is buffered in a buffer 450.

Signal Model

After frequency offset correction, the signal in the time domain is as follows:

$$r[n] = \sum_k Signal_k + A_{TX} + A_{RX} + w[n]$$

where the sum is over the set of signals on all non-zero subcarriers k, $A_{TX}$ is the complex-valued transmitter carrier leakage, $A_{RX}$ is the complex-valued receiver DC offset now oscillating at the inverse frequency offset $\Delta f$. For notational convenience, the actual offset coming from the RF is assumed to be $-\Delta f$. w[n] and $f_S$ are the thermal receiver noise and the sampling frequency corresponding to the discrete time-index n (e.g., 20 MHz and 50 ns, or 40 MHz and 25 ns).

Here, the specific shape of the signal components $Signal_k$, which will in general be affected by multipath phenomena, is not particularly important because the components will not show up explicitly in the algorithm. It is important to remember the indices k's are used in each portion of an OFDM packet. In the Short Preamble 310, only 12 subcarriers (±4, ±8, ±12, ±16, ±20, ±24) are used, producing a periodicity of 16 50 ns-samples. In the Long Preamble 320, all normal signal subcarriers are used, i.e., k ranges from (−26 to 26) excluding the 0'th subcarrier, which will typically be occupied by the Tx carrier leakage. The same is true for the data OFDM symbols.

In the following section, an existing DC scheme and various FFT domain DC offset estimation schemes are discussed.

DC Offset Compensation Schemes

Havens-Repko Algorithm

Figures 5, 6:
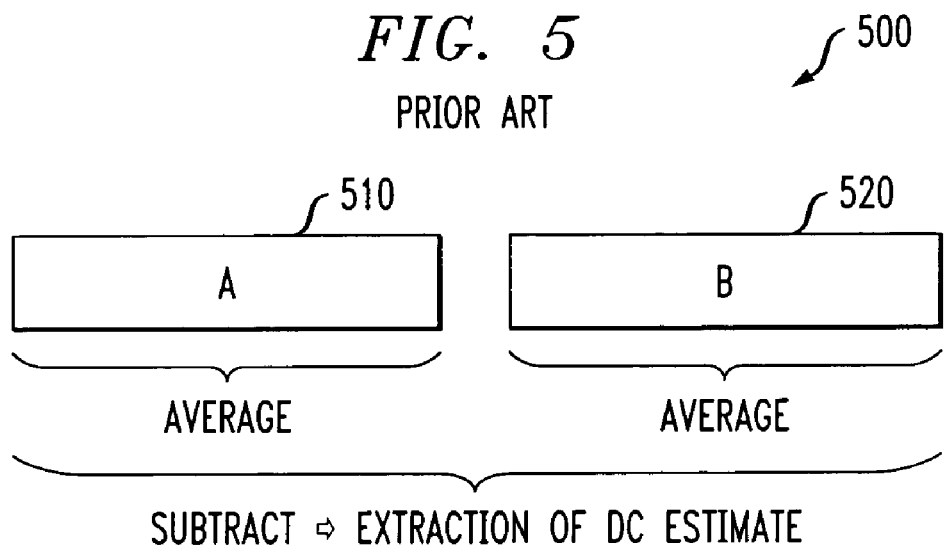
FIG. 5 illustrates the processing performed in accordance with a Havens-Repko DC offset compensation scheme for two consecutive OFDM symbols.
FIG. 6 illustrates the processing performed in accordance with an S-64 DC offset compensation scheme of the present invention applied to the short preamble.

FIG. 5 illustrates the processing performed in accordance with a Havens-Repko DC offset compensation scheme 500 for two consecutive OFDM symbols 510, 520. As shown in FIG. 5, the primary processing steps of the Havens-Repko DC offset compensation scheme are:

1. computing time averages across 64 samples on two consecutive OFDM symbols 510, 520;
2. subtracting the two averages; and
3. extracting the DC offset estimate from the result.

The first step removes any contributions from signal subcarriers, whose time-average is zero across any 64 samples within a given OFDM symbol (by construction of the OFDM modulation format). Hence, the result of step 1 will consist of the Tx and Rx DC terms—the former being a simple scaled version of the transmit DC term at this stage (falling on top of the grid at this point), the latter exhibiting a somewhat more involved relationship to the original receiver DC term according to the already corrected frequency offset.

Now, in order to remove the transmitter carrier leakage contribution, the two time averages are subtracted from one another. Thus, ideally only a term related to the Rx DC offset and thermal noise are remaining. Since the relationship between an existing DC term oscillating at the known frequency offset and this overall result of the first two processing steps (time average, subtraction) can be predicted, the original DC term can be extracted from the result of this computation.

This algorithm 500 can generally be applied to any two consecutive OFDM symbols 510, 520 (for instance, any two data symbols or the two Long Preamble symbols). In the former case, since a regular OFDM symbol has a 16 sample Guard Interval, the effective distance between the two symbols subtracted from each other is 80 samples. Therefore, in case, if the frequency offset is close to 1/(80 samples×50 ns)=250 kHz, the effect of the DC offset will be almost the same in the two symbols under consideration. Therefore, the subtraction will remove the receiver generated DC term almost completely, and thus it cannot be detected reliably even in low noise levels. In the latter case (two Long Preambles), where there is no extra guard interval between the two symbols to be exploited, the effective distance is only 64 samples. This, too, leads to a singularity, which is then at 312.5 kHz.

Whatever two symbols are used for the estimate, there will always be a singularity (point of impossible) estimation if there is close to no frequency offset whatsoever—because then it is difficult to differentiate between the DC terms generated at the transmitter and receiver. On the other hand, as previously indicated, a DC term at 0 is less critical, because the other subcarriers will be isolated from it in the FFT. Therefore, the singularity at the higher frequency offsets (250 kHz or 312.5 kHz) is more of a consideration.

It is also noted that a total of maximally 50 ppm/40 ppm of relative offsets corresponds to 125 kHz and 230 kHz in the 2.5 GHz and 5.8 GHz bands, respectively.

The performance of this algorithm 500 in terms of output DC power compared to the signal level is proportional to the input Signal-to-Noise ratio (SNR) and independent of the input DC strength. In other words, the better the signal strength at the antenna, the lower the average erroneous DC at the output of the correction algorithm. Also, this means that the algorithm is agnostic of the input DC level. Depending on the SNR, there will always be a certain DC error in the output, no matter what the input DC level is. Of course, this will lead to output DC offsets even in cases where the input signal from the analog front-end does not exhibit any DC contribution at all. And, on the other hand, theoretically, even a very high DC level coming from the analog circuit will not influence the outcome of the compensation algorithm. Non-linearity effects or quantization may impact the input DC levels coming from the RF that need to be within a certain fraction of the overall signal to avoid clipping in the various stages.

Also, importantly, since the performance of the algorithm 500 is impaired by thermal noise, i.e., a statistical process, the output DC power will represent a statistical process, too. Hence, it is crucial to not only look at the average DC power at the input, but also at the distribution.

These considerations illustrate that the main effects of this algorithm 500 can be captured by looking at the distribution of the output DC-to-Signal power ratio (DC/S) for two given input quantities: the SNR and the frequency offset.

FFT-Domain DC Offset Compensation Schemes

As discussed hereinafter, the present invention provides a number of exemplary digital DC compensation schemes. Generally, each of the disclosed techniques derive DC estimates in the frequency domain after taking a fast Fourier transform (FFT) of certain sections/forms of the Short or Long Preambles. The following exemplary techniques are provided:

1. 64-point FFT based scheme applied across four Short Preambles (referred to herein as the "S-64 algorithm");
2. 128-point FFT based scheme applied across the two Long Preambles (referred to herein as the "L-128 algorithm");
3. Extended HR algorithm using 64-point FFT across difference of the two Long Preambles (referred to herein as the "LD-64 algorithm"); and 4. Combined 64-point/128-point FFT based scheme applied to Short and Long Preambles ("SL algorithm").

Each of these disclosed FFT-domain DC offset compensation schemes have the following main characteristics:

1. applying an FFT to portions of the preamble;
2. exploiting or generating "empty" subcarriers;
3. analyzing/predicting the DC impact on these empty subcarriers;
4. deriving a DC estimate from each one of these analyses; and
5. optimally combining these individual estimates to give one overall estimate.

S-64 Algorithm: 64-Point FFT Applied to N Short Preambles

FIG. 6 illustrates the processing performed in accordance with the S-64 DC offset compensation scheme 600 applied to the short preamble 610. The exemplary implementation of the S-64 DC offset compensation scheme 600 shown in FIG. 6 assumes that the AGC loop and related transitory processes have settled after 6 Short Preamble symbols, such that the remaining four Short Preambles symbols 620 can be exploited for DC correction. The time samples are again assumed to come from a buffer and are perfectly frequency-offset corrected.

A 64-point FFT is taken across the final 64 samples of the Short Preamble, leading to a FFT-domain signal $R_S[p]$. Recalling that during the Short Preamble, only every fourth subcarrier on both sides of the center, $\pm 4, \pm 8, \ldots \pm 24$, carries a modulated symbol $+(1+j)$, it is evident that all the other subcarriers, $\{ \ldots -7, -6, -5, -3, -2, -1, +1, +2, +3, +5, +6, +7, \ldots \}$ are empty subcarriers. The contents of these empty subcarriers are given by DC and noise contributions only, $$R_S[q] = \sum_{n=0}^{N-1} a_{RX} e^{j2\pi \frac{\Delta f}{f_s}} e^{-j2\pi \frac{n_q}{N}} + \sum_{n=0}^{N-1} w[n] e^{j2\pi \frac{n_q}{N}} \quad (1)$$

$$= a_{RX} \beta_{S,\Delta f}[q] + W_s[q],$$

for $$q = \{\pm 1, \pm 2, \pm 3, \pm 5, \pm 6, \pm 7, \ldots \}$$

where $\beta_{S,\Delta f}[q]$ is the frequency offset specific coefficient describing the impact of the frequency-shifted DC term on the q'th subcarrier. It is given by $$\beta_{S,\Delta f}[q] = e^{j\pi(N-1)\left(\frac{\Delta f}{f_s} - \frac{q}{N}\right)} \frac{\sin\left[N\pi\left(\frac{\Delta f}{f_s} - \frac{q}{N}\right)\right]}{\sin\left[\pi\left(\frac{\Delta f}{f_s} - \frac{q}{N}\right)\right]} \quad (2)$$

$$\approx N e^{j\pi(N-1)\left(\frac{\Delta f}{f_s} - \frac{q}{N}\right)} \sin\left[N\pi\left(\frac{\Delta f}{f_s} - \frac{q}{N}\right)\right]$$

$W_S[q]$ is the noise-term in the 64-point FFT domain and is given by the FFT sum in Eq. (1).

Figure 7:
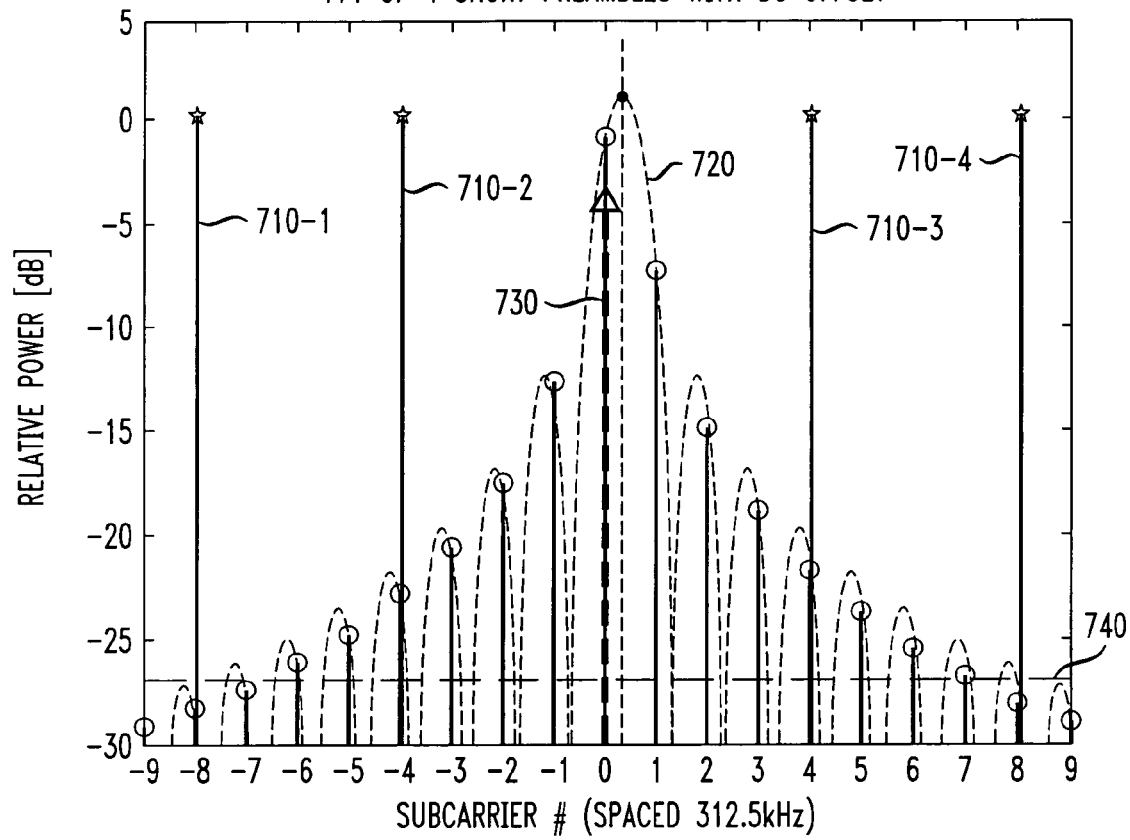
FIG. 7 illustrates the relative power of each subcarrier in the FFT domain.

FIG. 7 illustrates the relative power of each subcarrier in the FFT domain. Generally, FIG. 7 illustrates the result of taking a 64-point FFT across the four Short Preamble Symbols 620 (relative powers) when a DC offset and 90 kHz frequency offset are present. The lines 710-1 through 710-4 correspond to the preamble pilots. The lines having circles on their upper end correspond to DC contributions. The dashed line 720 is the "envelope" of the DC impact. The line 730 having a triangle is the LO leakage from TX and the horizontal line 740 illustrates an exemplary noise level.

The preamble pilots 710 are shown for an AWGN channel, i.e., all have the same level, but the actual channel is irrelevant to the performance of the scheme, since these subcarriers do not occur in the estimation.

Each one of the "empty" subcarriers (illustrated in FIG. 7 with lines having circles on their upper end) can be used to obtain a DC estimate. The DC estimates from each "empty" subcarrier can be combined, for example, using a Minimum Mean Squared Error (MMSE) combiner which emphasizes more strongly subcarriers that have a strong DC impact on them, $$\hat{a}_{RX} = \frac{\sum_{p \in \Pi_s} \beta^*_{S,\Delta f}[p] R_S[p]}{\sum_{p \in \Pi_s} |\beta_{S,\Delta f}[p]|^2} \quad (3)$$

where $\Pi_S$ is the set of empty subcarriers evaluated, and should here involve up to three subcarriers to the left and right of 0, $$\Pi_S = \{-3, -2, -1, +1, +2, +3\} \quad (4)$$

L-128 Algorithm: 128-Point FFT Applied to Two Long Preambles

Figure 8:
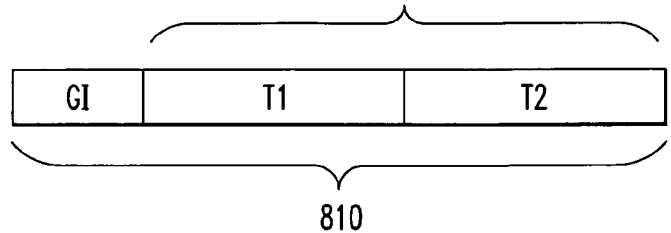
FIG. 8 illustrates the processing performed in accordance with the L-128 DC offset compensation scheme of the present invention applied to the long preamble.

FIG. 8 illustrates the processing performed in accordance with the L-128 DC offset compensation scheme 800 applied to the long preamble 810. As shown in FIG. 8, the FFT processing step will be applied to the 128 samples (spaced 50 ns) of two Long Preamble Symbols 820.

As shown in FIG. 8, once the (frequency-corrected) samples of the Long Preamble have been obtained, an FFT domain variable $R_L[q]$. More precisely, $R_L[q]$ is the result of a 128-point FFT taken across the 128 samples in the symbols T1 and T2. (The index "L" of $R_L[q]$ denotes the fact that a "long" FFT is taken in contrast to the conventional 64-point FFT.) Since a longer FFT integration time (here, $2 \times 3.2$ μs) increases the frequency resolution, the resulting subcarriers indexed q have a spacing of 312.5/2 kHz=156.25 kHz. Apparently, for any even q (q= ... −4, −2, 0, 2, 4, ...), this 128-point FFT will result in the original signals contained in the 312.5 kHz spaced domain: here, this relates to the BPSK modulated, wireless channel-scaled version of the Long Preamble sequence in the subcarrier domain, and the Tx carrier leakage. Of interest are the odd subcarriers $R_L[q]$, q= ... −3, −1, 1, 3 for their contents will be given by the receiver DC offset (and thermal noise) only. An illustration of a possible outcome of $R_L[q]$ is shown in FIG. 9 (in relative powers [dB]).

FIG. 9 illustrates a 128-point FFT across two Long Preambles with a DC offset term at 90 kHz. As shown in FIG. 9, the lines 910 are the regular subcarriers in the Long Preamble 810, which occur for even q (in the plot, an AWGN channel is assumed again, such that the height of all blue stems is identical). The line 920 (having the triangle at the upper end) is the Tx carrier leakage, and the horizontal line 930 denotes the exemplary noise level in each subcarrier. Note that the dB values are chosen for illustration purposes only. The lines having circles on their upper end and the dashed "envelope" 940 visualize the leakage of the DC term onto the 128-point domain subcarriers for a 90 kHz frequency offset. This leakage term will now be derived mathematically, since it will be needed for the correction algorithm.

For the "empty" subcarriers, i.e., the odd subcarriers in the 128 point domain where ideally there should be thermal noise only, $R_L[.]$ is given by $$R_L[q] = \sum_{n=0}^{N-1} a_{RX} e^{j2\pi \frac{\Delta f}{f_s}} e^{-j2\pi \frac{nq}{2N}} + \sum_{n=0}^{N-1} w[n] e^{j2\pi \frac{nq}{2N}} \qquad (5)$$

$$= a_{RX} \beta_{L,\Delta f}[q] + W_L[q],$$

for $$q = \{\pm 1, \pm 3, \dots \}$$

where $\beta_{L,\Delta f}[q]$ is the frequency offset specific coefficient describing the impact of the frequency-shifted DC term on the q'th subcarrier. It is given by $$\beta_{L,\Delta f}[q] = e^{j\pi(2N-1)\left(\frac{\Delta f}{f_s} - \frac{q}{2N}\right)} \frac{\sin\left[N\pi\left(\frac{\Delta f}{f_s} - \frac{q}{2N}\right)\right]}{\sin\left[\pi\left(\frac{\Delta f}{f_s} - \frac{q}{2N}\right)\right]} \qquad (6)$$

$$\approx 2N e^{j\pi(2N-1)\left(\frac{\Delta f}{f_s} - \frac{q}{2N}\right)} \sin\left[N\pi\left(\frac{\Delta f}{f_s} - \frac{q}{2N}\right)\right]$$

N is the conventional FF1 interval length, i.e., N=64. (such that 2N=128 is the desired FFT size for the scheme under investigation), and $W_L[q]$ is the noise-term in the 128-point FFT domain and is given by the FFT sum in Eq. (5).

The overall MMSE-based estimate can then be written as $$\hat{a}_{RX} = \frac{\sum_{q \in \Pi_L} \beta^*_{L,\Delta f}[q] R_L[q]}{\sum_{q \in \Pi_L} |\beta_{L,\Delta f}[q]|^2} \qquad (7)$$

where the summations are taken over a subset $\Pi_L$ of relevant "empty" subcarriers. A typical subset that contributes meaningful energies to the overall solution is here given by $$\Pi_L = \{-5, -3, -1, +1, +3, +5\} \qquad (8)$$

but even if fewer indices are used, an almost perfect solution will be obtained. Note, however, that due to the weighting it cannot be harmful to take into account more subcarriers than really needed.

As in the Havens-Repko algorithm, the estimate of Eq. (7) is a statistical quantity, such that subsequent DC compensation might (and will) subtract too little or too much equivalent DC energy depending on the noise situation during the preamble in a given packet. Also, the overall performance does not depend on the input DC-to-Signal ratio.

LD-64 Algorithm: Differential 64-Point FFT Applied to Long Preamble

FIG. 10 illustrates the processing performed in accordance with the LD-64 DC offset compensation scheme 1000 applied to the long preamble 1010. As shown in FIG. 10, the FFT processing step will be applied to the 128 samples (spaced 50 ns) of two Long Preamble Symbols T1, T2. The LD-64 DC offset compensation scheme 1000 takes 64-point FFTs across each symbol T1, T2 and subtracts the result. Alternatively, the time-samples of the two symbols can be subtracted, and then a single FFT is taken.

The result of this subtraction is variables $R_D[p]$. Since the two symbols T1, T2 as well as the Tx carrier leakage term are identical in both symbols, any contribution from these sources cancels out in the subtraction, leading to the following term for $R_D[p]$, $$R_D[p] = a_{RX} \cdot \sum_{n=0}^{N-1} \left\{ e^{j2\pi \frac{\Delta f}{f_s}(n+N)} - e^{j2\pi \frac{\Delta f}{f_s} n} \right\} e^{-j2\pi \frac{nq}{N}} + \qquad (9)$$

$$\sum_{n=0}^{N-1} w[n] e^{-j2\pi \frac{nq}{N}} - \sum_{n=N}^{2N-1} w[n] e^{-j2\pi \frac{nq}{N}}$$

$$\approx a_{RX} 2N e^{j\pi\left[(2N-1)\frac{\Delta f}{f_s} - (N-1)\frac{p}{N} + \frac{1}{2}\right]} \sin\left(\pi \frac{\Delta f}{f_s} N\right)$$

$$sinc\left[\pi N\left(\frac{\Delta f}{f_s} - \frac{p}{N}\right)\right] + W_D[p]$$

$$= a_{RX} \beta_{D,\Delta f}[p] + W_D[p]$$

where the DC impact coefficient $\beta_{D,\Delta f}[p]$ for subcarrier p is defined as $$\beta_{D,\Delta f}[p] = 2N e^{j\pi\left[(2N-1)\frac{\Delta f}{f_s} - (N-1)\frac{p}{N} + \frac{1}{2}\right]} \sin\left(\pi \frac{\Delta f}{f_s} N\right) sinc\left[\pi N\left(\frac{\Delta f}{f_s} - \frac{p}{N}\right)\right] \qquad (10)$$

The MMSE combining step is now given by $$\hat{a}_{RX} = \frac{\sum_{p \in \Pi_D} \beta^*_{D,\Delta f}[p] R_D[p]}{\sum_{p \in \Pi_D} |\beta_{D,\Delta f}[p]|^2} \qquad (11)$$

where the summation set $\Pi_D$ is given by the subcarriers around and including the DC subcarrier, $$\Pi_D = \{-3, -2, -1, 0, +1, +2, +3\} \qquad (12)$$

but as in the previous schemes, fewer indices also yield good results.

It has been found that the LD-64 scheme is equivalent in performance to the L-128 scheme.

SL Algorithm: Combined 64-Point/128-Point FFT Applied to Short/Long Preambles

The MMSE DC offset estimation in this algorithm is given by:

$$\hat{a}_{RX} = \frac{\sum_{p \in \Pi_S} \beta^*_{S,\Delta f}[p] R_S[p] + \sum_{p \in \Pi_L} \beta^*_{L,\Delta f}[q] R_L[q]}{\sum_{p \in \Pi_S} |\beta^*_{S,\Delta f}[p]|^2 + \sum_{p \in \Pi_D} |\beta^*_{L,\Delta f}[q]|^2} \qquad (13)$$

where $\beta_{S,\Delta f}[q]$ and $\beta_{L,\Delta f}[q]$ are given in Eq. (2) and Eq. (6), respectively, and $\Pi_S$ and $\Pi_L$ are given in Eq. (4) and Eq. (8), respectively.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for estimating a DC offset distortion of a received signal in a receiver, comprising the steps of:
    applying a fast Fourier transform to at least a portion of a preamble portion of said received signal;
    determining an impact of said DC offset distortion on one or more empty subcarriers;
    deriving individual DC estimates based on each of said determinations; and
    combining each of said individual DC estimates to obtain an overall DC estimate, wherein one or more of said steps are performed by a processor.

2. The method of claim 1, wherein said combining step further comprises the step of employing a Minimum Mean Squared Error (MMSE) combiner.

3. The method of claim 1, further comprising the step of removing said DC offset estimate from said received signal.

4. The method of claim 1, wherein said at least a portion of a preamble portion is a number of short preamble symbols from a Short Preamble, and wherein said determining step further comprises the step of determining a content of empty subcarriers in said number of short preamble symbols.

5. The method of claim 1, wherein said at least a portion of a preamble portion is at least two long preamble symbols from a Long Preamble, and wherein said determining step further comprises the step of determining a content of empty subcarriers in said at least two long preamble symbols.

6. The method of claim 1, wherein said fast Fourier transform is applied to each of at least two long preamble symbols from a Long Preamble, and further comprising the steps of subtracting a result of each of said fast Fourier transform and determining a content of empty subcarriers following said subtraction.

7. The method of claim 1, further comprising the steps of subtracting at least two long preamble symbols in a time domain, applying said fast Fourier transform to said subtracted time domain sequence, and determining a content of empty subcarriers following said fast Fourier transform.

8. The method of claim 1, wherein said combining step further comprises the step of employing a Minimum Mean Squared Error (MMSE) combiner to combine DC estimates from each "empty" subcarrier, as follows:

$$\hat{a}_{RX} = \frac{\sum_{p \in \Pi_S} \beta_{S,\Delta f}^*[p]R_S[p] + \sum_{p \in \Pi_L} \beta_{L,\Delta f}^*[q]R_L[q]}{\sum_{p \in \Pi_S} |\beta_{S,\Delta f}^*[p]|^2 + \sum_{p \in \Pi_D} |\beta_{L,\Delta f}^*[q]|^2} \quad (13)$$

where $\beta_{S,\Delta f}[q]$ is a frequency offset specific coefficient describing the impact of the frequency-shifted DC term on the q'th subcarrier; $\beta_{L,\Delta f}[q]$ is a frequency offset specific coefficient describing the impact of the frequency-shifted DC term on the q'th subcarrier; $\Pi_S$ is the set of empty subcarriers evaluated, and $\Pi_L$ is a subset of relevant "empty" subcarriers.

9. A system for estimating a DC offset distortion of a received signal in a receiver, comprising:
    a memory; and
    at least one processor, coupled to the memory, operative to:
        apply a fast Fourier transform to at least a portion of a preamble portion of said received signal;
        determine an impact of said DC offset distortion on one or more empty subcarriers;
        derive individual DC estimates based on each of said determinations; and
        combine each of said individual DC estimates to obtain an overall DC estimate.

10. The system of claim 9, wherein said processor is further configured to employ a Minimum Mean Squared Error (MMSE) combiner.

11. The system of claim 9, wherein said processor is further configured to remove said DC offset estimate from said received signal.

12. The system of claim 9, wherein said at least a portion of a preamble portion is a number of short preamble symbols from a Short Preamble, and wherein said processor is further configured to determine a content of empty subcarriers in said number of short preamble symbols.

13. The system of claim 9, wherein said at least a portion of a preamble portion is at least two long preamble symbols from a Long Preamble, and wherein said processor is further configured to determine a content of empty subcarriers in said at least two long preamble symbols.

14. The system of claim 9, wherein said fast Fourier transform is applied to each of at least two long preamble symbols from a Long Preamble, and wherein said processor is further configured to subtract a result of each of said fast Fourier transform and determine a content of empty subcarriers following said subtraction.

15. The system of claim 9, wherein said processor is further configured to subtract at least two long preamble symbols in a time domain, apply said fast Fourier transform to said subtracted time domain sequence, and determine a content of empty subcarriers following said fast Fourier transform.

16. A system for estimating a DC offset distortion of a received signal in a receiver, comprising:
    means for applying a fast Fourier transform to at least a portion of a preamble portion of said received signal;
    means for determining an impact of said DC offset distortion on one or more empty subcarriers;

means for deriving individual DC estimates based on each of said determinations; and means for combining each of said individual DC estimates to obtain an overall DC estimate.

17. The system of claim 16, wherein said means for combining further comprises means for employing a Minimum Mean Squared Error (MMSE) combiner.

18. The system of claim 16, further comprising means for removing said DC offset estimate from said received signal.

19. The system of claim 16, wherein said at least a portion of a preamble portion is a number of short preamble symbols from a Short Preamble, and wherein said means for determining further comprises means for determining a content of empty subcarriers in said number of short preamble symbols.

20. The system of claim 16, wherein said at least a portion of a preamble portion is at least two long preamble symbols from a Long Preamble, and wherein said means for determining further comprises means for determining a content of empty subcarriers in said at least two long preamble symbols.

21. The system of claim 16, wherein said fast Fourier transform is applied to each of at least two long preamble symbols from a Long Preamble, and further comprising means for subtracting a result of each of said fast Fourier transform and means for determining a content of empty subcarriers following said subtraction.

22. The system of claim 16, further comprising means for subtracting at least two long preamble symbols in a time domain, means for applying said fast Fourier transform to said subtracted time domain sequence, and means for determining a content of empty subcarriers following said fast Fourier transform.

* * * * *